(12) United States Patent
Almeras et al.

(10) Patent No.: US 7,461,815 B2  
(45) Date of Patent: Dec. 9, 2008

(54) SUSPENSION SYSTEM FOR A ROTARY WING AIRCRAFT ENGINE

(75) Inventors: Philippe Almeras, Senas (FR); Jean Mondet, Pelissanne (FR)

(73) Assignee: Eurocopter, Marignane (FR)

( * ) Notice: Subject to any disclaimer, the term of this patent is extended or adjusted under 35 U.S.C. 154(b) by 564 days.

(21) Appl. No.: 11/175,300

(22) Filed: Jul. 7, 2005

(65) Prior Publication Data

US 2006/0038060 A1 Feb. 23, 2006

(30) Foreign Application Priority Data

Jul. 9, 2004 (FR) .................................. 04 07727

(51) Int. Cl.
  *B64D 27/00* (2006.01)
(52) U.S. Cl. ...................... 244/54; 244/17.27; 248/638; 248/556
(58) Field of Classification Search ............... 244/54, 244/53 R, 55, 17.27; 248/554, 555, 556, 248/557, 638
  See application file for complete search history.

(56) References Cited

U.S. PATENT DOCUMENTS

| | | | | |
|---|---|---|---|---|
| 2,063,639 A * | 12/1936 | Trott et al. | .................. | 248/605 |
| 2,467,759 A * | 4/1949 | Lord | .......................... | 248/556 |
| 2,510,963 A * | 6/1950 | Dibblee | .................... | 267/140.4 |
| 2,716,011 A * | 8/1955 | Steimen | ...................... | 248/616 |
| 2,965,349 A * | 12/1960 | Hutton | .................. | 267/140.13 |
| 3,727,862 A * | 4/1973 | Kaufhold et al. | ............. | 244/54 |
| 4,274,510 A * | 6/1981 | Mouille et al. | ........... | 244/17.27 |
| 4,362,281 A * | 12/1982 | Cresap et al. | ............ | 244/17.27 |
| 4,422,627 A * | 12/1983 | Schmidt et al. | ............ | 267/148 |
| 4,725,046 A * | 2/1988 | Sugino | ................... | 267/140.13 |
| 4,942,075 A * | 7/1990 | Hartel et al. | ................ | 428/109 |
| 4,984,777 A * | 1/1991 | Kurr et al. | ............ | 267/140.13 |
| 5,102,107 A * | 4/1992 | Simon et al. | ............... | 267/152 |
| 5,782,430 A * | 7/1998 | Mouille | ............. | 244/17.27 |
| 5,897,093 A * | 4/1999 | Le Derf | ...................... | 248/628 |
| 6,019,313 A * | 2/2000 | Lenhart et al. | ................ | 244/60 |
| 6,065,742 A * | 5/2000 | Whiteford | ................ | 267/140.5 |
| 6,199,801 B1 * | 3/2001 | Wilke et al. | ................. | 244/170 |
| 6,290,183 B1 * | 9/2001 | Johnson et al. | ............ | 244/170 |
| 6,328,293 B1 * | 12/2001 | Olsen | ................... | 267/140.11 |
| 6,715,746 B2 * | 4/2004 | Bachmeyer et al. | ......... | 267/294 |
| 6,827,553 B2 * | 12/2004 | Jones et al. | ................. | 416/106 |
| 7,063,290 B2 * | 6/2006 | Marche | ........................ | 244/54 |
| 7,249,756 B1 * | 7/2007 | Wilke et al. | ................. | 267/152 |

* cited by examiner

*Primary Examiner*—Bret Hayes
*Assistant Examiner*—Benjamin P Lee
(74) *Attorney, Agent, or Firm*—Young & Thompson

(57) ABSTRACT

The invention relates to a system for suspending an engine of a rotary wing aircraft. The technical field of the invention is that of manufacturing suspension devices for helicopter engines. The invention consists in a device for suspending an engine (21) to a rotary aircraft airframe (26), which device includes a deformable structure (20) interconnecting two attachment zones (13, 17) of the device.

17 Claims, 3 Drawing Sheets

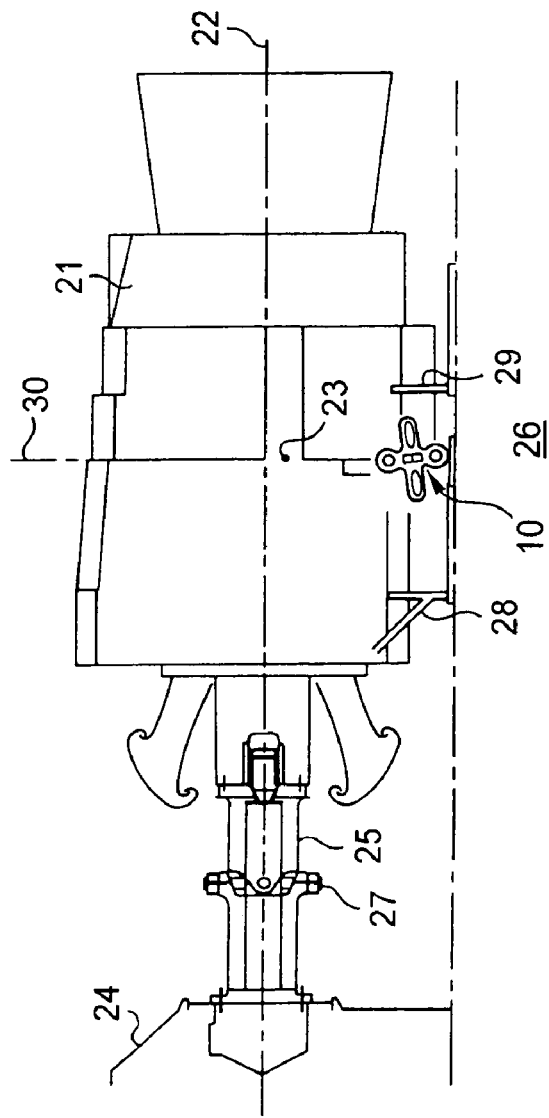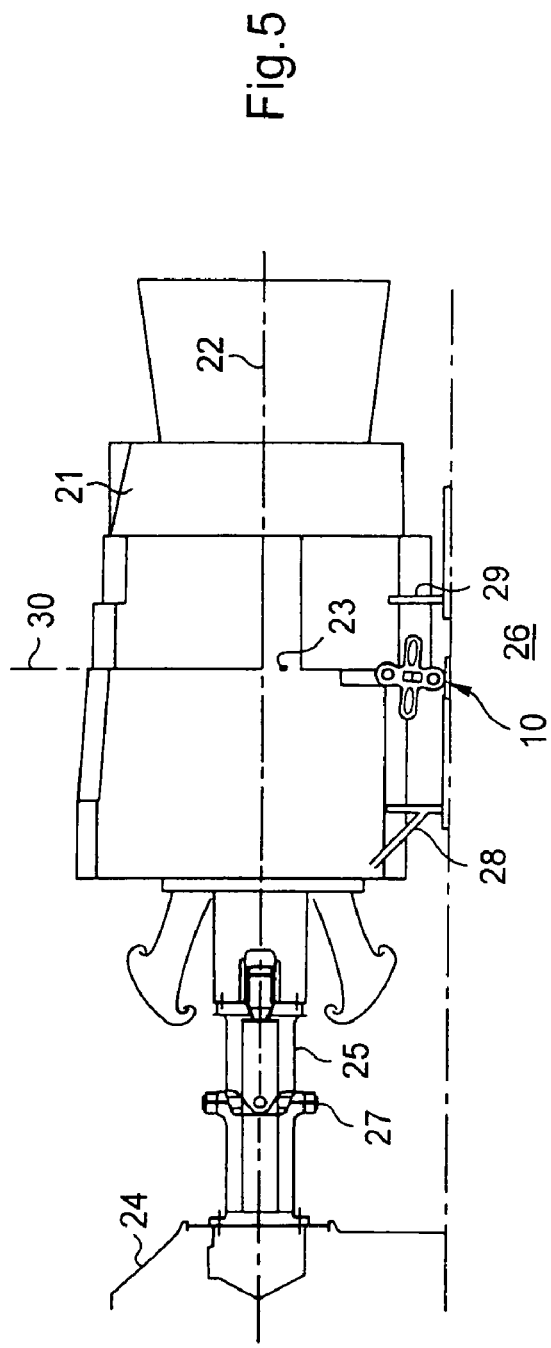

SUSPENSION SYSTEM FOR A ROTARY WING AIRCRAFT ENGINE

The present invention relates to a suspension system for a rotary wing aircraft engine.

The technical field of the invention is that of fabricating suspension devices for helicopter engines.

The present invention applies more particularly to a device for fastening a propulsion engine to the airframe of a helicopter.

BACKGROUND OF THE INVENTION

Such fastening is generally provided by bars or legs secured to the engine and resting on the airframe, by bars secured to the engine and to the airframe, and/or by a mechanical connection with a main transmission gearbox to which the engine is coupled.

The framework (or airframe) of a helicopter presents deformation resonance modes; each resonance mode can be excited when the resonant frequency corresponding to a resonance mode is close enough to an excitation frequency; this leads to deformation of large amplitude and to large forces that can damage the aircraft. Amongst the vibratory phenomena that can excite these resonance modes, there are the harmonics of the frequency of rotation of the lift and propulsion main rotor of the helicopter, and in particular the harmonic that corresponds to the number of rotor blades.

OBJECTS AND SUMMARY OF THE INVENTION

An object of the invention is to propose a system for fastening the engine to the airframe of a rotary wing aircraft that enables the vibration caused by rotation of the rotor to be decreased.

Another object of the invention is to propose a device for suspending the engine of a rotary wing aircraft which, at least in part, remedies the drawbacks of known devices.

An object of the invention is to propose such a fastener device that absorbs a large quantity of energy in the event of a impact.

In a first aspect, the invention provides a device for fastening an engine to the airframe of a rotary wing aircraft, which device has an intermediate portion (or structure) extending between two attachment zones (for connecting the device to the engine and for connecting the device to the airframe) that presents stiffness that is sufficiently low to enable it under normal conditions (in flight) to deform substantially elastically, thereby limiting the level of vibration on board the aircraft.

In a preferred embodiment, the elastically-deformable structure comprises one or more metal blades.

Also preferably, the elastically-deformable structure is tuningfork- or U-shaped, in particular it is in the form of two identical U-shapes facing each other and forming a ring; such a structure is normally stressed in compression, which corresponds to moving the limbs of the U-shapes and/or of the ring towards each other along the longitudinal axis of the device or engine-fastening strut; the longitudinal axis of the U-structure (or ring) extends transversely, i.e. substantially orthogonally to the longitudinal axis of the suspension device.

This provides a suspension device that is effective, compact, reliable, and capable of withstanding high temperatures.

In a more preferred embodiment, the fastener device and/or engine support strut includes a hinge or pivot at each of its two longitudinal ends; more preferably, each of the hinges presents at least two degrees of freedom in rotation, in particular when constituted by a spherical joint.

This makes it possible to ensure the strut is stressed only in traction and compression along its longitudinal axis interconnecting the two hinges.

This type of structure can be used as a link when connecting together or separating the engine and the helicopter airframe; for this purpose, it is preferable for the pivoting strut or link to be fastened to the engine via its top spherical joint in a vertical plane containing the center of gravity of the engine, or in the immediate proximity of said plane; the support link or strut is also fastened to the airframe via its bottom spherical joint at a point such that its longitudinal axis can take up two slightly inclined positions disposed on either side of the vertical plane; this makes it easier for the links to tilt from one position to the other, with such tilting corresponding to the engine moving closer to the main gearbox, or conversely to the engine and the gearbox moving apart.

By adding a guide rail along the axis of rotation of the engine and because of the compressibility of the strut, during such tilting movement the engine can follow a rectilinear path in translation along said axis of rotation of the engine, instead of a circular path about the bottom connection spherical joint; this makes it easier to couple the engine to the gearbox and conversely to uncouple them, by avoiding any need to angle the connection between the engine and the gearbox.

The elastically-deformable structure is given stiffness such that the engine is decoupled from the airframe at the troublesome frequency, and such that the resonance modes in suspension do not match the vibratory excitation sources that are present on board the aircraft.

In a preferred embodiment, each of the struts or links presents stiffness that is less than or equal to 1500 newtons per millimeter (N/mm), and in particular lies in a range 500 N/mm to 1000 N/mm, for example being close to 700 N/mm or 800 N/mm.

Also preferably, the axes of the spherical joints are substantially orthogonal to the longitudinal axis of the device which they intersect, and they are substantially orthogonal to the traverse axis along which the blades of the elastically-deformable structure extend.

It has been found that by suspending a propulsion engine weighing about 260 kilograms (kg) by means of a device comprising two such elastic fastener links of characteristics adapted to the restraint stiffness of the helicopter structure, excitation of the resonance modes of the helicopter structure is reduced at frequencies that are close to the rotor blade frequency, thereby improving the comfort of the passengers.

According to another preferred characteristic, the suspension link or device comprises two substantially undeformable rigid end portions interconnected by the elastically-deformable structure, and further comprises means for mutually guiding the two rigid end portions in relative displacement in translation along the longitudinal axis of the device. These guide means may, in particular, be in the form of a cylindrical peg or shaft extending along the longitudinal axis of the link and fastened to a first portion, and an orifice or bore pierced in a second portion thereof and receiving a fraction of the shaft or peg. In the event of the link being compressed or extended longitudinally, and in the absence of any transverse stress, the two end portions, which are separated by the metal blade forming the deformable structure, remain in alignment on the longitudinal axis because of the symmetry of the device about said longitudinal axis; under such circumstances, guidance is neither needed nor desirable in order to avoid any risk of the guidance device suffering wear. For this purpose, clearance is left between the peg or shaft and the orifice or bore in which it slides.

Under the effect of interfering transverse stress, the clearance is taken up, and the peg sliding in its bore ensures that the two end portions of the link are guided along an axis that is substantially longitudinal.

In a preferred embodiment, the device or link further comprises at least one abutment in compression limiting the extent to which the device can be shortened by compressing the elastically-deformable structure, and/or at least one abutment in extension limiting the extent to which the device can be lengthened by extending the elastically-deformable structure.

In a more preferred embodiment, the device or link has two extension abutments limiting the elongation of the deformable structure to two distinct values, and a fusible structure presenting a zone of weakness that is designed to deform or break while releasing means for activating the second abutment in extension (such as said shaft or peg): said means override the first abutment corresponding to the smaller of the two elongation values, in favor of the second abutment that corresponds to the greater of the two elongation values.

These means make it possible to use plastic deformation of at least a portion of the suspension device, in particular the deformable structure and the fusible structure, in order to absorb a fraction of the energy in the event of an impact, e.g. due to the aircraft suffering a very hard or "crash" landing.

According to another aspect of the invention, a system is provided for suspending a rotor drive engine to the airframe of a rotary wing aircraft, which system comprises at least one suspension devices are defined above, and a hinged connection with a gearbox driven by the engine, in particular a universal joint.

BRIEF DESCRIPTION OF THE DRAWINGS

Other characteristics and advantages of the invention appear from the following description which refers to the accompanying drawings that show preferred embodiments of the invention that are of no limiting character.

Except where stated to the contrary, identical references are used in all of the figures to designate members or elements that are identical or similar.

FIG. 1 is a plan view of the device; FIG. 2 is a section view on a plane containing the longitudinal axis of the link, and as seen looking along A-A in FIG. 1; and FIG. 3 is a view of the device of FIGS. 1 and 2.

FIGS. 4 and 5 are diagrammatic side views of a helicopter engine fitted with a suspension system of the invention shown in two distinct configurations: a configuration for coupling the engine to a main gearbox is shown in FIG. 4; while FIG. 5 shows the same elements when uncoupled, the engine being moved away from the gearbox by tilting the two links forming part of its support system.

Figure 2:
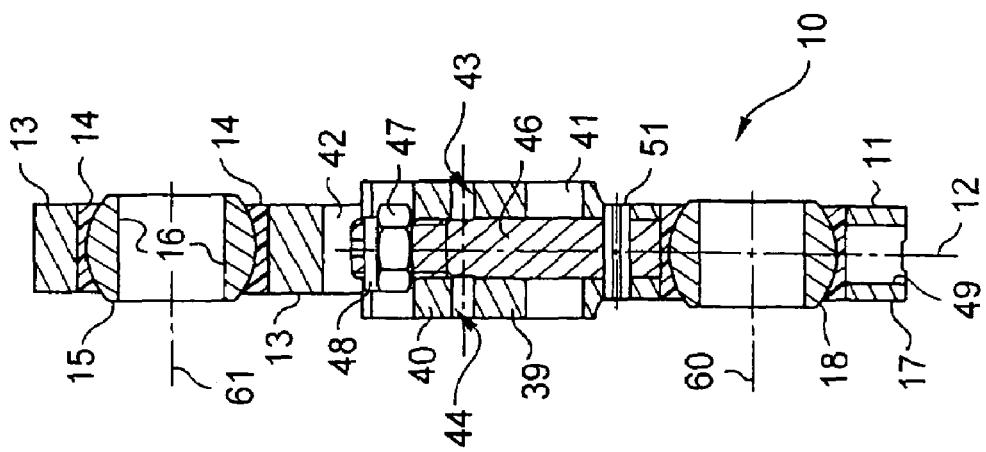
FIGS. 1 to 3 show a preferred embodiment of an engine suspension device in the form of a strut or link.
Figure 1:
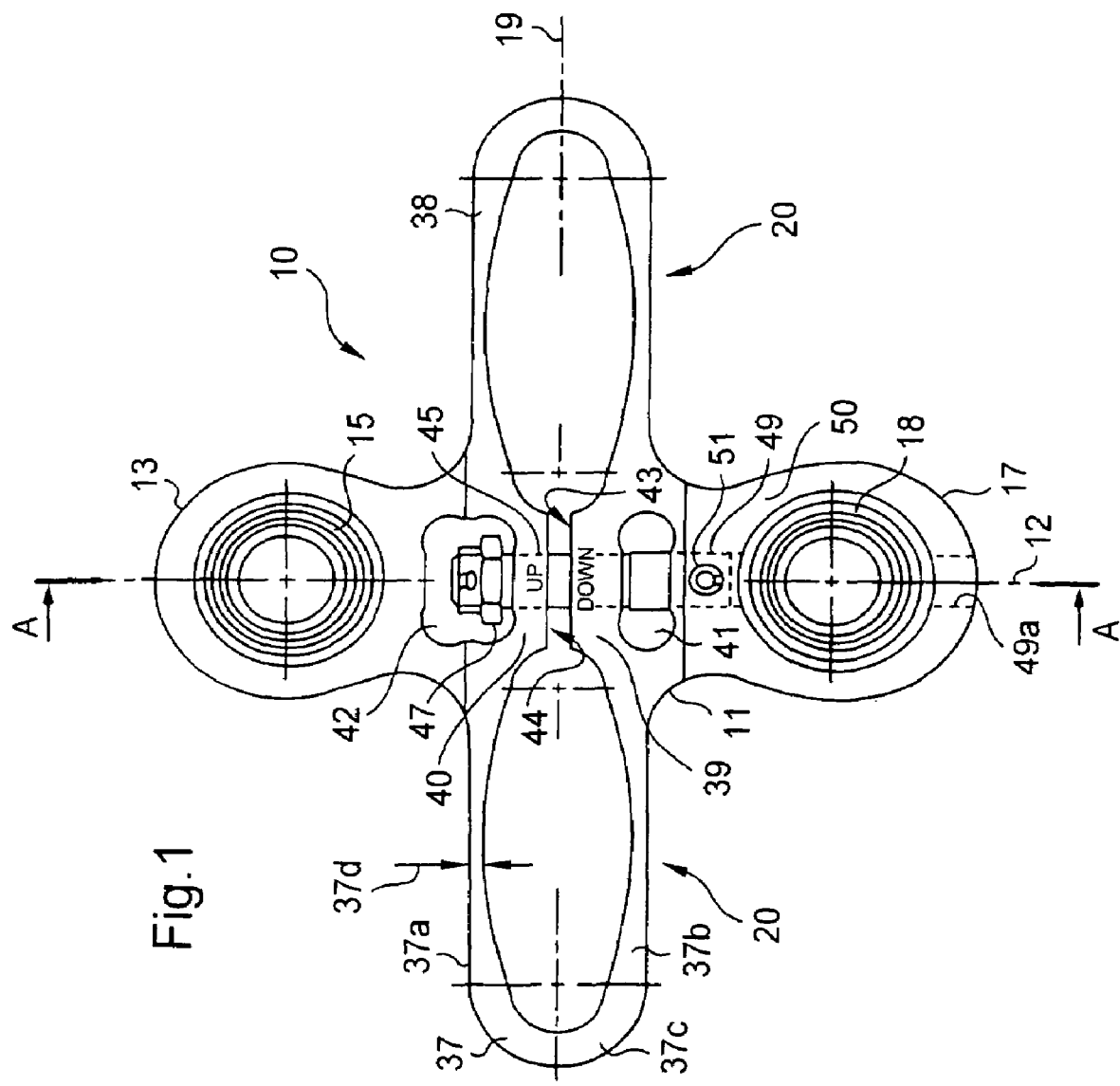
Figure 6:
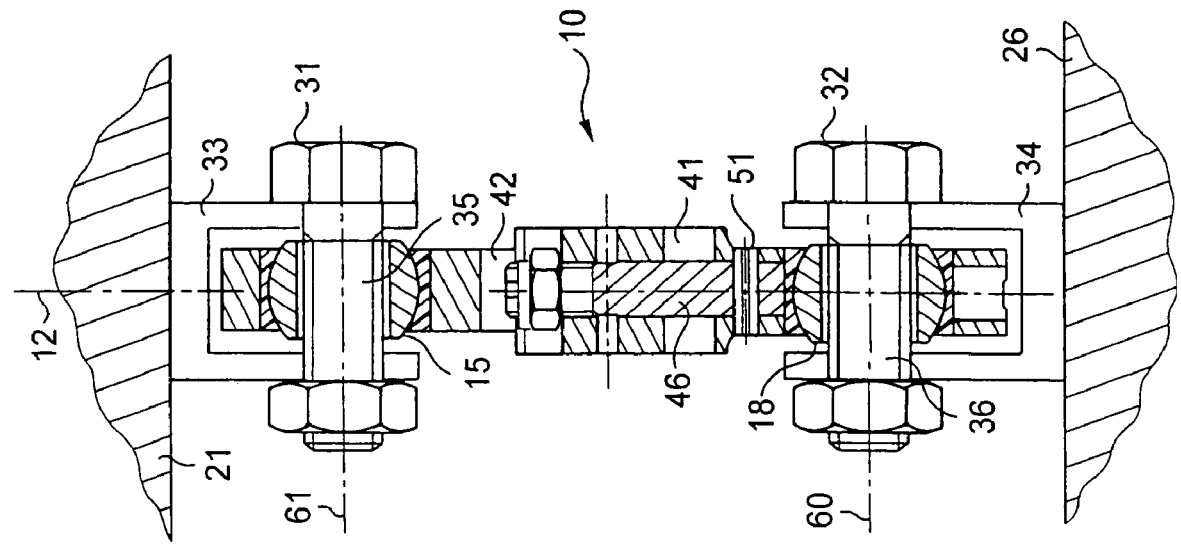
FIG. 6 shows the mechanical connections by means of bolts between the spherical joints fitted to a link and two forks, one fork being secured to an engine and the other to a helicopter airframe receiving the engine.
Figure 3:
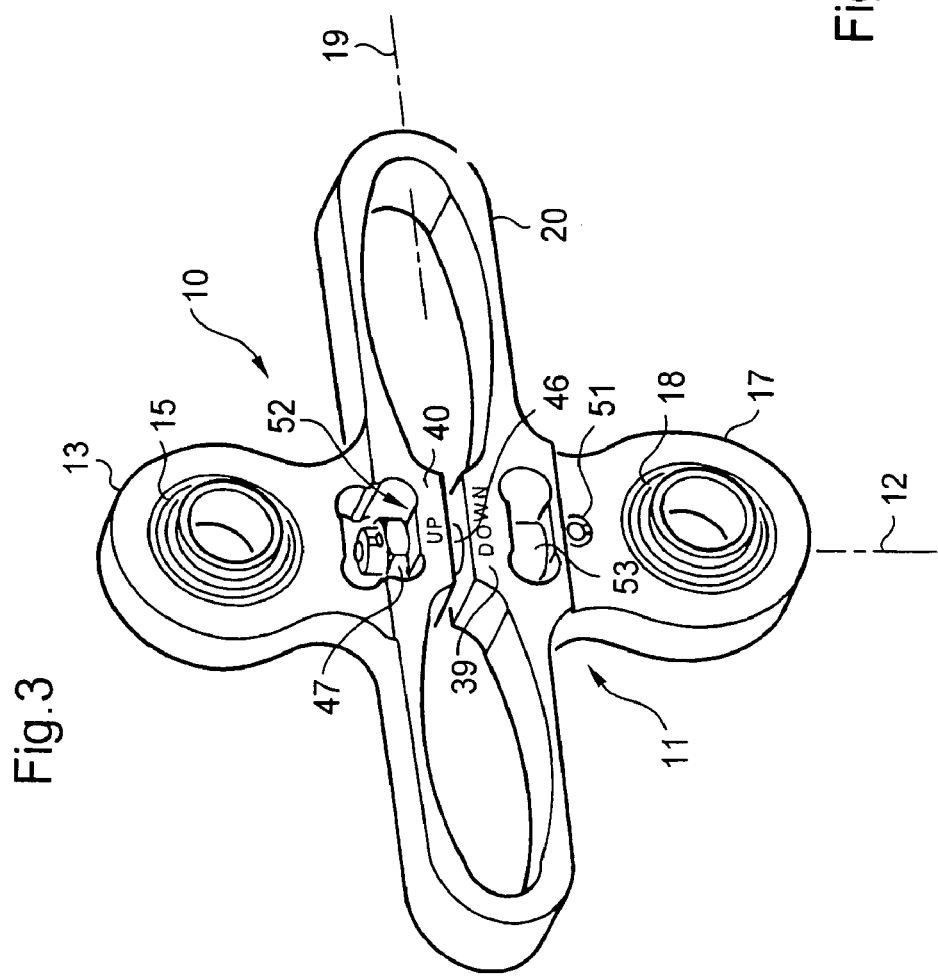

The suspension links shown in FIGS. 4 to 6 are identical to those shown in FIGS. 1 to 3.

MORE DETAILED DESCRIPTION

With reference to FIGS. 1 to 3, the suspension link 10 presents a metal body 11 (made of titanium) which extends along a longitudinal axis 12 and which is essentially constituted by:
  a first end portion 13 of annular shape surrounding the bearing outer socket 14 of a first spherical joint 15 whose inner ball is referenced 16;
  a second end portion 17 substantially identical to the first portion 13 and fitted in the same manner with a second spherical joint 18; and
  a middle portion extending between the two end portions; this portion comprises an elastically-deformable structure 20 extending along an axis 19 that is orthogonal to the axis 12, together with means for limiting the amplitude of deformation of the structure 10, 20, and means for absorbing energy in the event of a large impact.

With reference to FIGS. 4 to 6 in particular, the engine 21 presents an outlet shaft extending along an axis 22, and presents a center of gravity 23.

The engine is secured to a gearbox 24 to which it is coupled via said outlet shaft and a connection 25 in the form of a tube; this connection is hinged relative to the gearbox 24 via universal joints 27 forming part of the connection 25; this connection extends around the shaft for transmitting power from the engine to the gearbox. The universal joint serves to accommodate small misalignments in the transmission of power between the engine and the gearbox; the tubular connection 25 or "trumpet" transmits the opposing or "running" torque to the stator of the engine.

Apart from this hinged connection, the engine is secured to the airframe via two links 10 extending (FIGS. 4 and 5) in planes that are slightly inclined relative to the vertical plane 30 orthogonal to the axis 22 and containing the center of gravity 23; in the normal operating position shown in FIG. 4, both links 10 are tilted to the left of the plane 30, whereas in the decoupling position shown in FIG. 5, both links 10 are tilted to the right of the plane.

To install or remove the engine, the engine is also fitted with at least one tool constituting a rigid leg 28, 29 enabling the engine to rest on the airframe; the bottom of the leg bears against a rail forming part of the airframe and extending parallel to the axis 22, and along which said bottom can slide: after removing the links 10, the configuration shown in FIG. 5 enables the engine 21 subsequently to slide along the axis 22 while being supported by its legs 28, 29 on the airframe 26, thus enabling the engine to be removed completely from the helicopter.

Going from the configuration shown in FIG. 4 to that shown in FIG. 5 requires prior release of the connection 25 relative to the engine, and also loosening of the connections between each of the links and both the engine and the airframe; these connections are constituted essentially by bolts 31, 32 passing through fork-shaped fittings 33 and 34 secured respectively to the engine 21 and to the airframe 26, and they extend through respective bores 35, 36 of the spherical joints 15, 18 provided at the ends of the link 10 (cf. FIG. 6).

With reference to FIGS. 1 to 3 in particular, the link 10 presents symmetry about its longitudinal axis 12; the deformable structure presents the shape of an elongate ring made up of two identical blades 37 and 38 bent into facing U-shapes; these U-shaped blades extend along a transverse axis 19 on either side of the longitudinal axis 12 of the link, are interconnected via the ends of their limbs, and interconnect the two end portions 13, 17 of the body 11 of the link 10.

Each of the two blades, such as the blade referenced 37, has two portions or limbs 37a and 37b which extend on either side of the axis 19 and which are united by the base 37c of the U-shape; each limb presents a central portion of reduced thickness 37d, with said thickness being, in particular, less than the thickness of the transverse end portion 37c.

The ends of the limbs facing each other in pairs are united by respective bridges 39 and 40 that cross the axis 12; each bridge presents a plane bearing surface 43, 44 perpendicular to the axis 12, these two surfaces facing each other.

Between the top bridge 40 and the top end 13 there is provided a cavity 42; in the same way, a cavity 41 extends between the bottom bridge 39 and the bottom end 17 of the link; these bridges are pierced by a longitudinal bore 45 in which there extends a guide shaft or rod 46 made of stainless steel and provided with a small amount of clearance.

The top end of the shaft 46 is threaded and receives a nut 47 that is prevented from moving by a pin 48, and that occupies the cavity 42; the opposite end of the shaft 46 extends in a longitudinal bore 49 pierced in a region 50 of the bottom end portion 17 of the link that extends between the cavity 41 and the bottom spherical joint 18.

The bore 49 is extended by another bore 49a of axis 12 to enable the shaft 46 to be put into place in the bores 45 and 49 before the spherical joint 18 is put into place in its housing. The shaft 46 is prevented from moving once in position by a second pin 51 of axis orthogonal to the plane of FIG. 1.

The portion of the shaft 46 which extends in the cavity 41 presents a swelling 53 so that the diameter of this portion of the shaft is greater than the diameter of the bore 45.

When the link 10 is subjected to compression forces tending to move the spherical joints 15 and 18 towards each other along the axis 12, the limbs of the blades bend, with the blades 37 and 38 becoming pinched, and the surfaces 43 and 44 move towards each other. If traction is applied, the movements take place in the opposite directions.

The elastic ring structure is protected from being flattened by abutment means: the two faces 43 and 44 come into abutment against each other at a determined level of acceleration, e.g. twice the acceleration due to gravity (2 g); the ring is then no longer subjected to flattening stress with forces then being transmitted directly through the support link from the engine to the structure of the aircraft, or vice versa.

The guide 46 serves to keep the two flexible portions of the ring on the axis 12 in the event of a radial or transverse stress being applied.

In the event of a crash-landing, the weight of the engine generates a force that is absorbed in part by deforming the ring in compression until the abutments 43 and 44 come into contact, after which it is transmitted to the airframe structure.

The reaction force from the airframe structure returns the weight of the engine in the opposite direction, and the supports then come into action, the link and the ring working in traction for the purpose of holding the engine against rising.

Successively activating the two abutments in extension corresponds to two distinct levels of impact and takes place as follows: a bearing surface 52 of the bridge 40 that extends around the bore 45 facing the bottom of the nut 47 comes into contact with the nut and pulls the rod 46 (towards the top end of the link), which thereby begins by shearing the pin 51 and absorbing a fraction of the energy of the impact.

Thereafter the swelling 53 of the rod 46 is forced into the bottom portion of the bore 45 pierced through the bridge 39 of the engine support 10, thereby absorbing an additional fraction of the energy of the impact; simultaneously, the ring 20 is stressed and deforms in traction; this deformation also consumes energy and can be continued until the link body breaks.

In the event of one of the two blades 37, 38 of the link breaking, the abutments 43, 44 come into contact and the shaft 46 keeps the two ends of the link in alignment; the effectiveness of the suspension is then lessened, but safety is ensured since the engine is held in position.

What is claimed is:

1. A system for suspending a rotor drive engine (21) to an aircraft airframe (26), the system comprising:
    at least one device (10) for suspending the engine to the airframe, each device (10) including i) two attachment portions (13, 17), a first of the two attachment portions for connecting the device to the engine and a second of the two attachment portions for connecting the device to the airframe, and ii) a deformable structure (20) lying between the two attachment portions (13, 17), wherein,
    the deformable structure (20) comprises a plurality of blades (37, 38),
    each suspension device further has a compression abutment (43, 44) configured to limit an extent to which the suspension device can be shortened by a deformation of the deformable structure (20), and
    each suspension device has a first extension abutment configured to limit an elongation of the device, the elongation by deformation of the deformable structure, to a first elongation value, and a second extension abutment configured to limit the elongation to a second elongation value,
    wherein the second elongation value is greater than the first elongation value.

2. A system according to claim 1, wherein each of the blades of the deformable structure (20) comprises at least one tuning-fork or U-shaped portion configured to be pinched under the action of compression forces thereby shortening the device.

3. A system according to claim 1, in which the blades of the deformable structure form an elongate ring extending transversely relative to a longitudinal axis (12) of the device, and
    the two attachment portions are mutually spaced apart along the longitudinal axis.

4. A system according to claim 1, in which the deformable structure (20) has a longitudinal stiffness less than or equal to 1500 newtons per millimeter, and
    the deformable structure (20) is essentially made of metal.

5. A system according to claim 1, in which each suspension device further includes a pivot (15, 18) in each of the two attachment portions, and
    in which the two attachment portions are rigid.

6. A system according to claim 5, in which each pivot (15, 18) has the form of a spherical joint.

7. A system according to claim 6, in which axes (60, 61) of the spherical joints are orthogonal to a longitudinal axis (12) of the device which the axes (60, 61) intersect, and
    the axes (60, 61) are orthogonal to a transverse axis (19) along which the blades (37, 38) of the elastically-deformable structure extend.

8. A system according to claim 1, in which the deformable structure interconnects the two attachment portions (13, 17), and
    said device further comprises means (45, 46) for mutually guiding the two attachment portions in displacement along a longitudinal axis (12) of the device.

9. A system according to claim 8, in which said mutual guidance means comprises i) a shaft or guide (46) and ii) an orifice or bore (45) slidably receiving the shaft or guide along the longitudinal axis (12).

10. A system according to claim 1, in which each suspension device further includes a fusible structure (51) having a zone of weakness configured to enable activation of the second extension abutment (45, 43).

11. A system according to claim 1, comprising two devices (10) for suspending the engine to the airframe, and further comprising a hinged connection (25, 27) with a gearbox (24) driven by the engine.

12. A system according to claim 1,
wherein each device has a first spherical joint (15) in the first attachment portion and a second spherical joint (18) in the second attachment portion, each device being fastened to the engine via the first spherical joint (15) in one of i) a vertical plane (30) containing the center of gravity (23) of the engine, and ii) the immediate proximity of said plane, and
wherein the device is fastened to the airframe via the second spherical joint (18) at a point such that a longitudinal axis (12) of the device can take up two slightly sloping positions disposed on opposite sides of said vertical plane.

13. A system according to claim 1, wherein the extent to which the device is shortened extends in a direction along a longitudinal axis (12) of the device, and the elongation of the deformable structure extends in the direction along the longitudinal axis (12).

14. A system for suspending a rotor drive engine (21) to a rotary wing aircraft airframe (26), the system comprising:
at least one device (10) for suspending the engine to the airframe, each device (10) including a deformable structure (20) interconnecting two attachment zones (13, 17) of the device, each attachment zone including a first pivot (15) for connecting the device to the engine and a second pivot for connecting the device to the airframe, and the structure (20) comprising two tuning-fork or U-shaped blades (37, 33) configured to be pinched under the action of longitudinal compression forces thereby shortening the device, wherein,
the deformable structure (20) has a longitudinal stiffness that is less than or equal to 1500 newtons per millimeters, and
each suspension device includes a first extension abutment limiting an elongation of the device, the elongation by deformation of the deformable structure, to a first elongation value, and a second elongation device limiting the elongation to a second elongation value, the second elongation value being greater than the first elongation value.

15. A system according to claim 14, in which the deformable structure (20) has a longitudinal stiffness that is less than or equal to 1500 newtons per millimeter.

16. A device (10) for suspending a rotor drive engine (21) to a rotary wing aircraft airframe (26), the device comprising:
first connecting means (15) for connection to the engine;
second connecting means (18) for connection to the airframe; and
a body (11) having a longitudinal axis (12) and a transverse axis (19), the body comprising:
a first rigid end portion (13) receiving the first connecting means,
a second rigid end portion (17) receiving the second connecting means,
a middle portion extending between the two end portions,
guiding means for mutually guiding the first and second rigid end portions in relative displacement in translation along the longitudinal axis, wherein,
the middle portion comprises i) an elastically deformable structure (20) extending along the transverse axis (19) and comprising two U-shaped blades (37,38) configured to be pinched to shorten the device along said longitudinal axis, ii) abutment means for limiting an amplitude of deformation of the deformable structure (20), and iii) energy absorbing means for absorbing energy by plastic deformation of a part of the middle portion,
the abutment means includes a first extension abutment and a second extension abutment, the first extension abutment limiting an elongation of the device along the longitudinal axis to a first elongation value, and a second extension abutment limiting the elongation of the device along the longitudinal axis to a second elongation value, the second elongation value being greater than the first elongation value, and
the energy absorbing means includes a fusible structure (51), having a zone of weakness and configured to enable activation of the second extension abutment (45, 43)

17. A device according to claim 16,
wherein, the first rigid end portion is of annular shape and surrounds a first spherical joint (15) for connecting the device to the engine, and
the second rigid end portion is of annular shape and surrounds a second spherical joint (18) for connecting the device to the airframe.

\* \* \* \* \*